United States Patent [19]

Cain et al.

[11] Patent Number: 5,262,911
[45] Date of Patent: Nov. 16, 1993

[54] APPARATUS AND METHOD FOR MOUNTING TRANSDUCER HEADS IN A HARD DISK DRIVE

[75] Inventors: Michael A. Cain; Steven S. Eckerd, both of Oklahoma City, Okla.

[73] Assignee: Seagate Technology, Inc., Scotts Valley, Calif.

[21] Appl. No.: 925,324

[22] Filed: Aug. 6, 1992

Related U.S. Application Data

[63] Continuation of Ser. No. 639,136, Jan. 9, 1991, abandoned.

[51] Int. Cl.⁵ .......................... G11B 21/16; G11B 5/55
[52] U.S. Cl. ........................................ 360/104; 29/603
[58] Field of Search .................... 360/104, 106; 29/603

[56] References Cited

U.S. PATENT DOCUMENTS

| | | | |
|---|---|---|---|
| 4,391,035 | 7/1983 | Van De Bult | 29/603 |
| 4,829,395 | 5/1989 | Coon et al. | 360/104 |
| 4,855,851 | 8/1989 | Radwan et al. | 360/104 |
| 4,912,583 | 3/1990 | Hinlein | 360/104 |
| 4,947,275 | 8/1990 | Hinlein | 360/104 |
| 4,991,045 | 2/1991 | Oberg | 360/104 |
| 5,012,367 | 4/1991 | Tdensing | 360/106 |
| 5,027,239 | 6/1991 | Hagen | 360/104 |
| 5,062,018 | 10/1991 | Yaeger | 360/104 |
| 5,099,373 | 3/1992 | Shibata et al. | 360/104 |

Primary Examiner—Robert S. Tupper
Attorney, Agent, or Firm—Edward P. Heller, III; Bill D. McCarthy; Louis W. Watson

[57] ABSTRACT

Apparatus for supporting transducer heads of a hard disk drive wherein the heads are mounted on transducer support arms that are, in turn, mounted on extensive fingers formed on an actuator that moves the heads across surfaces of data storage disks. Two holes are formed through each finger to form two coaxial sets of holes on the actuator body and one hole in each finger receives a tubular boss formed about one of two equally spaced holes formed through one end of each support arm each arm. Bosses inserted into coaxial holes in the fingers extend thereinto from the same direction and are swaged to fix the support arms to the actuator by passing a ball through the bosses from the opposite direction. The support arms are constructed by spot welding swage plates, each having two holes formed therethrough and having a boss about one hole, to leaf members, similarly having two holes formed therethrough, whereon the transducer heads are mounted.

4 Claims, 4 Drawing Sheets

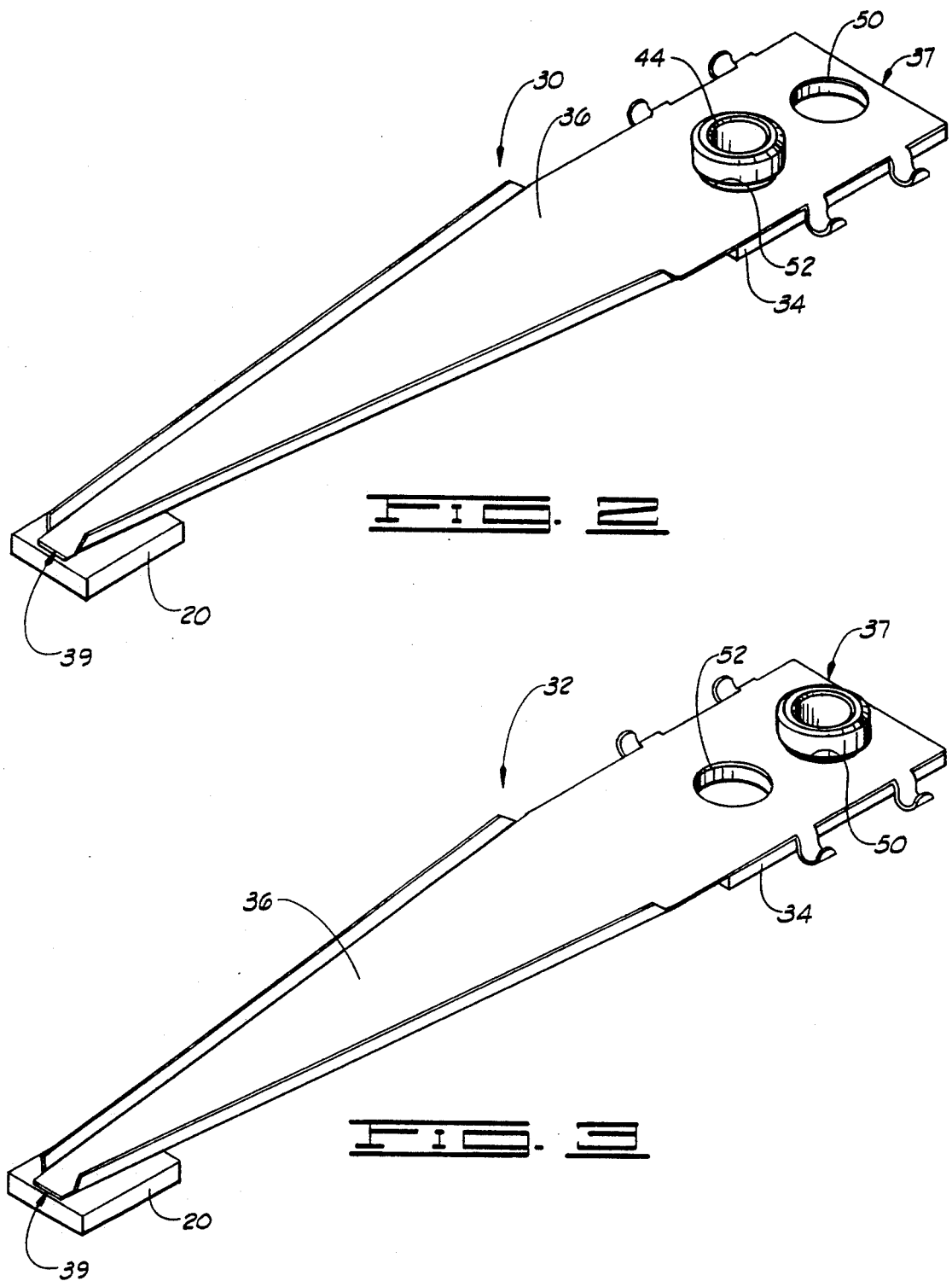

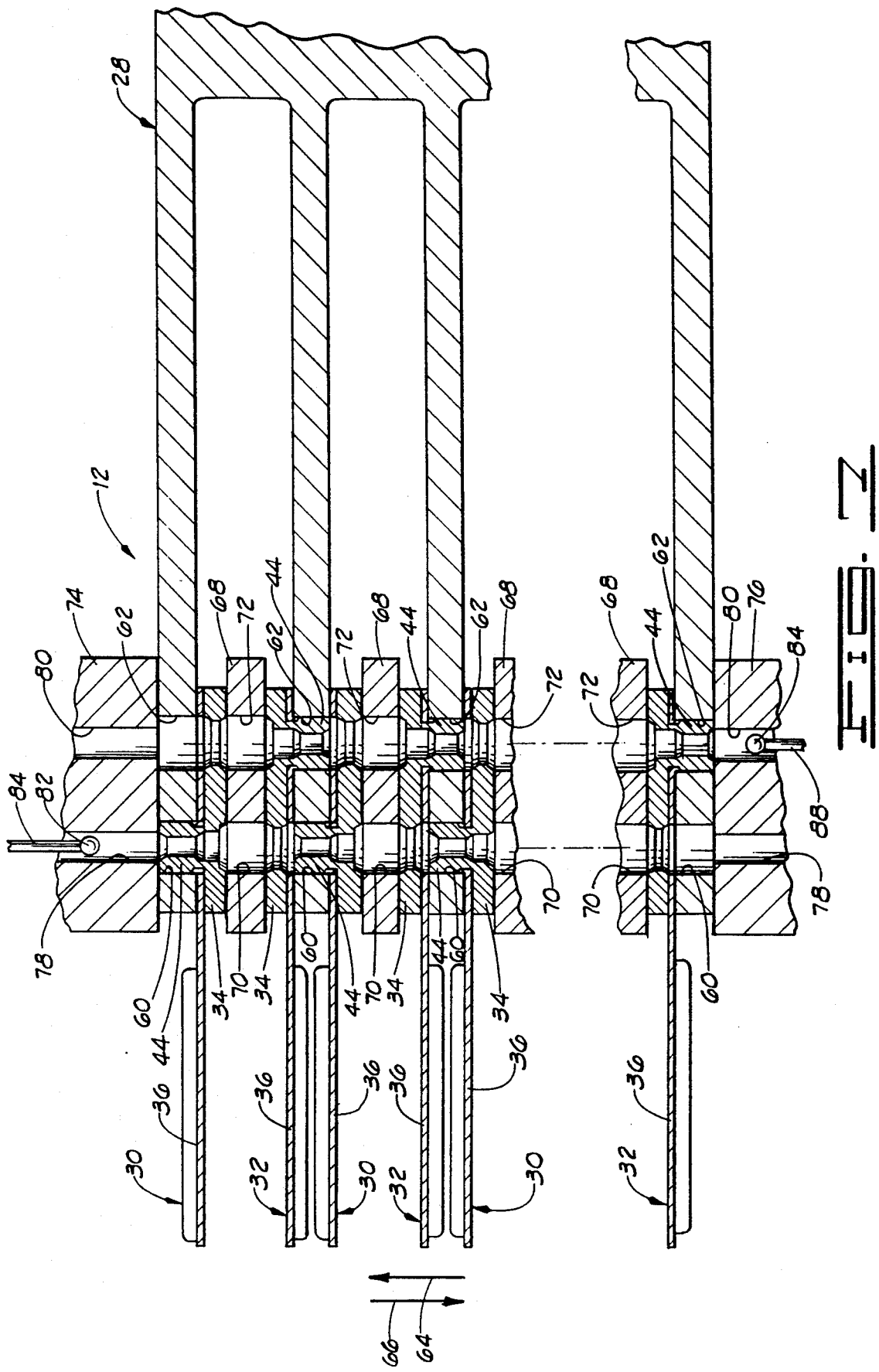

APPARATUS AND METHOD FOR MOUNTING TRANSDUCER HEADS IN A HARD DISK DRIVE

This is a continuation of copending application Ser. No. 07/639,136 filed on Jan. 9, 1991, now abandoned.

BACKGROUND OF THE INVENTION

1. Field of the Invention

The present invention relates generally to improvements in disk drives, and, more particularly, but not by way of limitation to improvements in the mounting of transducer heads on actuators by means of which the heads are positioned along surfaces of data storage disks.

2. Brief Description of the Prior Art

In hard disk drives, data is stored on magnetizable surfaces of a plurality of rotatable disks that are mounted in a coaxial stack on a housing of the drive. Transducer heads that read and write the data from and to the surfaces are supported by a actuator that is mounted on the housing and can be moved thereon to position the transducer heads in alignment with data tracks defined on the disks. The support of the heads by the actuator is effected through transducer support arms that are attached to the actuator body and are comprised of leaf members that extend across the surfaces of the disks and are constructed of light sheet steel that will flex sufficiently to permit air swirled by the disks when they are rotated to lift the heads slightly off the disks so that the heads to "fly" across the disk surfaces.

In the past, it has been common practice to attach the support arms to the actuator body using swage plates that form a part of the transducer support arms and are spot welded to the leaf members. The swage plates and the leaf members each have a hole formed therethrough and a tubular boss is formed about the hole through the swage plate on the side thereof that faces away from the leaf member. Bosses on two support arms are then inserted into each of a series of holes formed through a plurality of fingers extending from one end of the actuator body, one boss entering the hole from each end, and a ball is passed through the tubular bosses to force the peripheries of the bosses into tight engagement with the inner peripheries of the holes through the finger. Thus, each finger carries two support arms that are fixed to opposite sides thereof to support two transducer heads in close proximity to two disk surfaces in the assembled hard disk drive.

While this method of mounting transducer heads has worked well in the past, problems have arisen as the need for increased data storage capacity in hard disk drives has grown. As is known in the art, a hard disk drive will often have to meet size limitations that are imposed by the mounting of the drive in the case of a computer. Thus, while the data storage capacity of a hard disk drive might, in principle, be increased by adding disks, in practice, the number of disks has been limited by overall drive size requirements and the necessity of forming a strong connection between the actuator and the transducer support arms. More particularly, to provide a sufficient area of contact between the bosses on the transducer support arms and the inner peripheries of the holes formed in the actuator body, it has been necessary to provide the fingers through which such holes are formed with a thickness that exceeds the thickness necessary to provide support for the transducer support arms and, consequently, to space the disks, one from another, a distance that is greater than would be necessary if the finger thicknesses could be selected on the basis of rigidity considerations alone.

Moreover, it has been found that the conventional method of supporting transducers on the actuator, as described above, gives rise to a second problem. Because of the joining of two transducer support arms to each actuator finger by passing a ball through two bosses in the same hole the finger, an asymmetry exists in the forces that are exerted on the bosses to make the joints. Specifically, the bosses extend in opposite directions with respect to the direction of passage of the ball through the bores of the bosses. Thus, for one transducer support arm, the ball is passed in a direction that will tend to place the boss in compressive stress while, for the other transducer support arm, the direction of passage of the ball will be such to tend to place the boss in tensile stress. It has been found that placing a boss in tensile stress during the swaging operation that joins the transducer support arms to the actuator will often result in a weak joint between the boss and the actuator. In order to prevent tearing of the boss, resulting in a weak joint, the expansion of the boss during swaging must be limited and such limitation will limit the contact forces between the boss and the finger hole periphery to, again, form a weak joint.

SUMMARY OF THE INVENTION

The present invention solves these problems by providing a transducer head support apparatus in which the construction of the actuator body and the transducer support arms not only permits the thickness of fingers on the actuator body to be kept to a minimum, thereby maximizing the number of disks the hard disk drive can contain, but also ensures that all joints formed by a swaging operation carried out on bosses formed on the transducer support arms will place the bosses in compression and thereby form a strong joint between the actuator body and each of the support arms. In one aspect of the invention, alternate transducer heads are supported by first and second transducer support arms having alternative constructions. In particular, two spaced apart first and second holes are formed through each finger of the actuator body and corresponding holes are formed through each of the actuator support arms to align with the holes in the actuator body when the transducer heads are appropriately positioned with respect to the disks in the assembled hard disk drive. In the first transducer support arms, a boss is formed about the hole that aligns with a first actuator hole and, in the second transducer arms, a boss is formed about the hole that aligns with the second actuator hole. Subsequently, two transducer support arms, a first transducer support arm and a second transducer support arm, are mounted on opposite sides one actuator finger with only one boss in each actuator finger hole. Consequently, the thickness of the actuator finger can be reduced to a thickness that will suffice to rigidly support the transducer support arms thereon. Thus, closer spacing of the disks and a consequent larger number of disks and, more importantly, data storage capacity can be achieved.

In a second aspect of the invention, the mounting of first and second support arms on opposite sides of the actuator fingers permits strong joints to be formed between the transducer support arms and the actuator body. Such support will extend bosses of all first transducer support arms into first actuator holes from one direction and will extend all bosses of all second transducer arms into second actuator holes from the opposite direction. Mounting of the transducer support arms on the actuator body is then accomplished by clamping the arms in the position they are to occupy in the assembled hard disk drive and passing balls through the actuator holes and boss bores in directions opposite the directions in which the bosses extend into the actuator holes. Thus, the swaging operation that expands the bosses into firm contact with the inner peripheries of the actuator holes to secure the transducer support arms to the actuator body will place each of the bosses in compressive strain to result in a strong joint that is free of defects, such as tears, in the bosses.

An important object of the present invention is to increase the data storage capacity of hard disk drives by enabling the number of data storage disks to be maximized.

Another object of the invention is to provide strong joints between actuators and transducer support arms of hard disk drives.

Other objects, features and advantages of the present invention will become apparent from the following detailed description when read in conjunction with the drawings and appended claims.

BRIEF DESCRIPTION OF THE DRAWINGS

FIG. 2 is a perspective view of a first transducer arm of the transducer head support apparatus.

FIG. 3 is a perspective view of a second transducer arm of the transducer head support apparatus.

FIG. 7 is a fragmentary cross section of the actuator taken along line 7—7 of FIG. 1 illustrating the manner in which the transducer support arms are joined to the actuator body.

DESCRIPTION OF THE PREFERRED EMBODIMENT

Figure 1:
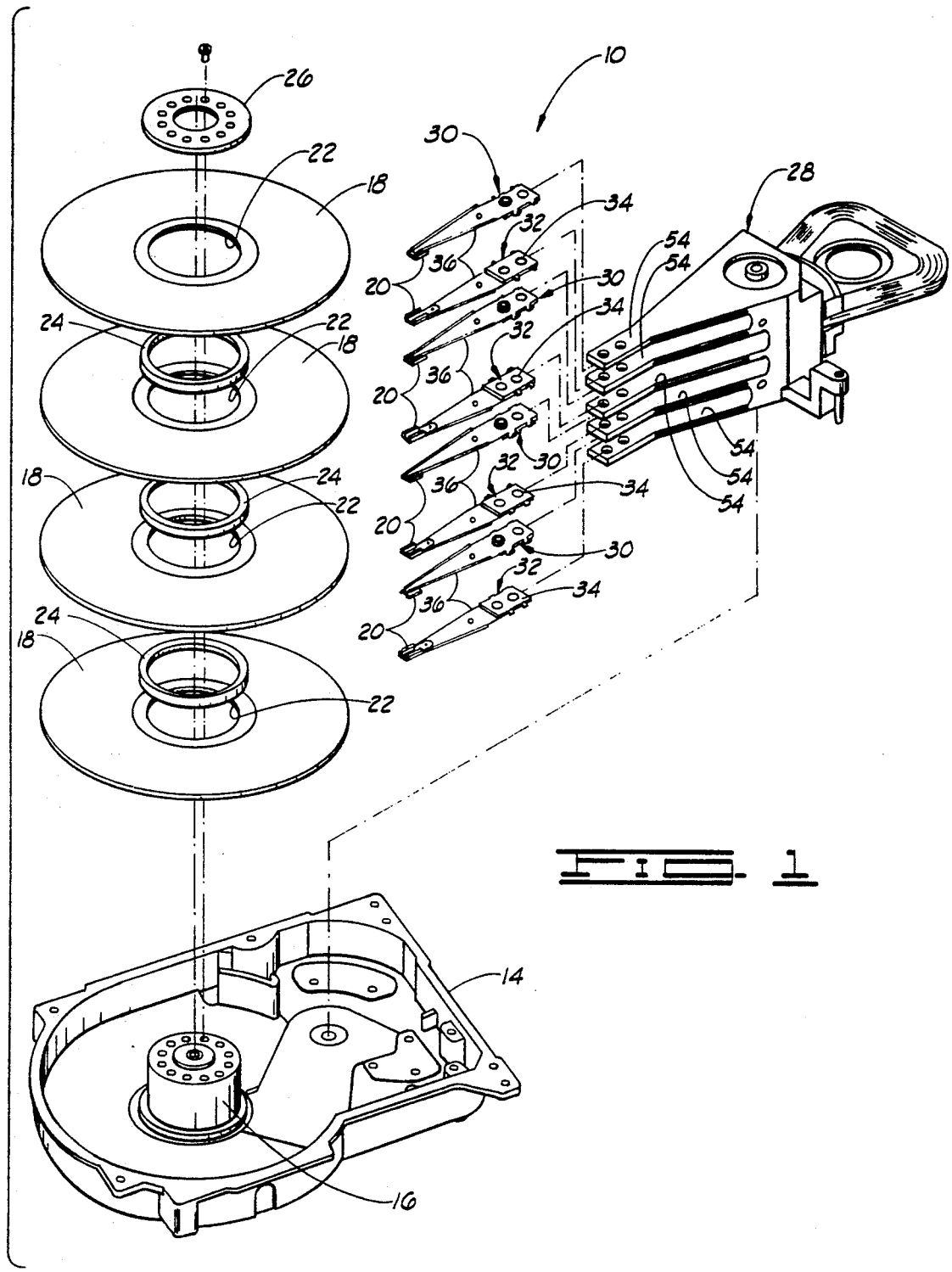
FIG. 1 is an exploded view of portions of a hard disk drive including a transducer head support apparatus constructed in accordance with the present invention.

Referring now to the drawings in general and to FIG. 1 in particular, shown therein and designated by the general reference number 10 is a hard disk drive including a transducer head support apparatus 12 (not numerically designated in FIG. 1) shown in more detail in FIG. 7. As shown in FIG. 1, the hard disk drive 10 is comprised of a housing 14 in which is mounted an electric motor 16 that supports and rotates a plurality of data storage disks 18. As is known in the art, the disks 18 are constructed of aluminum and have magnetizable surface coatings so that data can be written to the surfaces o read therefrom by transducer heads 20 that are mounted on transducer support arms that will be described below with reference to FIGS. 2 and 3. The disks 18 have central apertures 22 that are sized to provide a slip fit on the rotor of motor 16 to form a vertical stack in which the disks are maintained at a selected spacing by spacers 24 that are positioned between disks 22 within the stack. The stack is formed into a rigid unit by a keeper plate 26 mounted on the uppermost disk 18 and secured to the motor 16 by bolting the plate 26 thereto.

The transducer head support assembly is comprised of an actuator body 28 which is conventionally mounted within the housing 14 to support a plurality of first transducer support arms 30 (FIG. 2) and second transducer support arms 32 (FIG. 3) that, in turn, support the transducer heads in close proximity to the surfaces of the disks 18. As can be seen in FIG. 1, the first and second transducer support arms 30, 32 alternate so that transducer heads 20 on first transducer support arms read and write to one side of the disks 18 while transducer heads 20 on second transducer support arms read and write to opposite side of the disks 18. The mounting of the transducer support arms 30, 32 on the actuator body 28 will be discussed below with reference to FIG. 7. As is conventional, the transducers can be moved across the surfaces of the data disks 18 by pivoting the actuator body 28 in a manner that is known in the art.

Referring to FIGS. 2 and 3, each of the transducer support arms 30, 32 is comprised of a swage plate 34, preferably stamped of sheet stainless steel, to which is spot welded an extensive leaf member 36, also stamped from sheet stainless steel, and the transducers are fixed to the undersides of the leaf members 36, as the leaf members have been illustrated in FIGS. 2 and 3, in a conventional manner. As shown, the swage plates 34 are located at one end 37 of the leaf members 36 and the transducers are located at the opposite end 39 of the leaf members so that, when the transducer support arms 30, 32 are attached to the actuator body 28 via the swage plates in a manner that will be discussed below, the transducer heads will be supported a selected distance from the actuator body 28 to enter the stack of disks 18 for positioning of the transducer heads 20 at selected radii from the axis of the stack.

Figure 4:
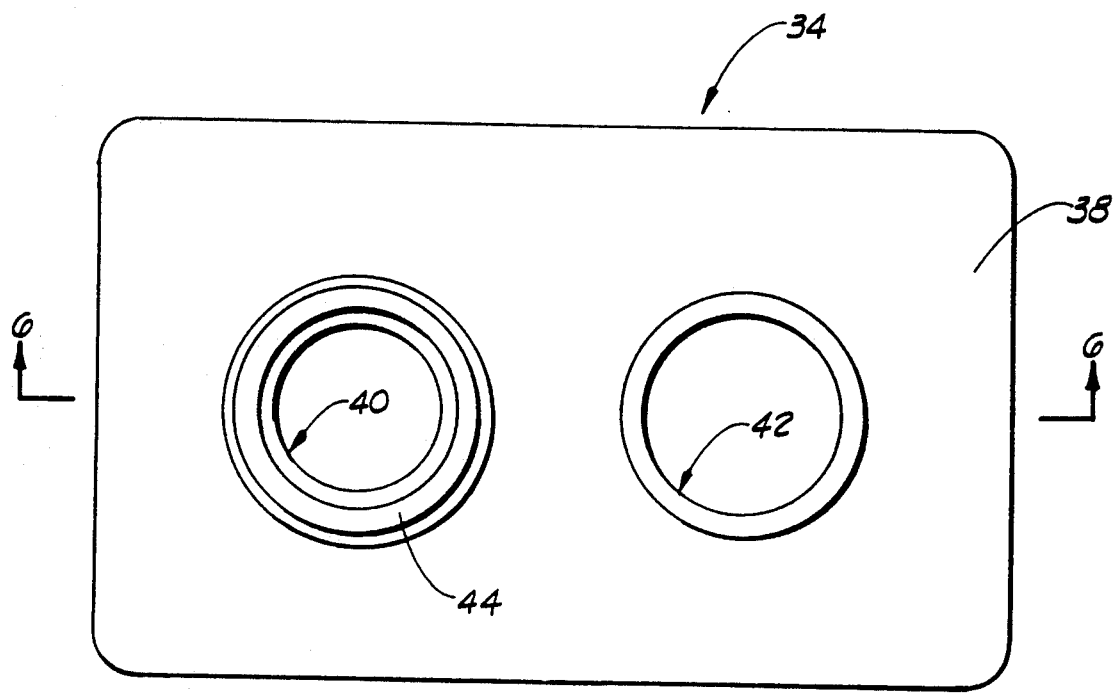
FIG. 4 is a top view of a swage plate of which the transducer support arms are comprised.
Figure 5:
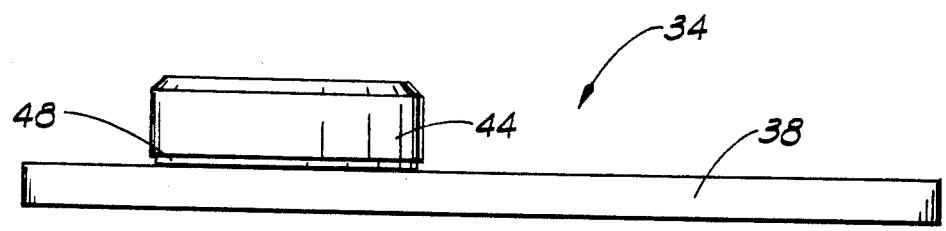
FIG. 5 is a side view of the swage plate.
Figure 6:
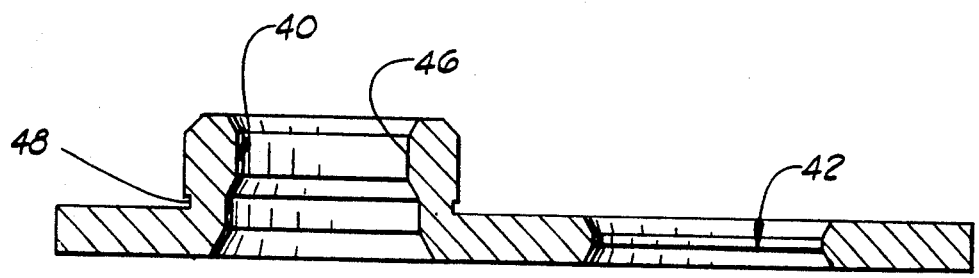
FIG. 6 is a cross section of the swage plate taken along line 6—6 of FIG. 4.

The transducer support arms 30, 32 differ in the orientation of the swage plates 34 on the leaf members 36 as will now be described with additional reference to FIGS. 4 through 6. As shown in these Figures, each swage plate 34 is comprised of a laminar body portion 38 through which two holes 40 and 42 are formed. About the hole 40, a tubular boss 44 is integrally formed on one side of the body portion 38. Interiorly, the bore of the tubular boss 44 has a reduced diameter portion 46 that is used in the joining of the swage plate 34 to the actuator body 28 in a manner to be discussed below. Exteriorly, the boss 44 is provided with a circumferential groove 48 whose purpose will similarly be discussed below.

Returning to FIGS. 2 and 3, holes 50 and 52 are formed through the leaf member 36, near the end 37 thereof, and the boss 44 of a swage plate 34 is extended through the hole 52 in the leaf member 36 of the first transducer support arms 30 prior to spot welding the swage plate to the leaf member 36. Similarly, the boss 44 of a swage plate is extended through the hole 50 in the leaf member 36 of the second transducer support arms 32 prior to spot welding of the swage plate to the leaf member. Thus, first and second transducer support arm holes are provided by the holes 40, 42 of the swage plate 34 and one such hole is surmounted by the boss 44. For purposes of discussion, the transducer support arm holes that are surmounted by the boss 44 in the first transducer support arms will sometimes be referred to as first transducer support arm holes and the transducer support arm holes that are surmounted by the boss 44 in the second transducer support arms will sometimes be referred to as second transducer support arm holes. As noted above, grooves 48 are formed in the outer peripheries of the bosses 44. Such grooves provide clearance between the bosses 44 and portions of the leaf members 36 about the holes 50 and 52 so that the leaf members do not engage the bosses and will not be distorted when the bosses are deformed to attach the transducer support arms 30, 32 to the actuator body in the manner discussed below.

Returning to FIG. 1 and with additional reference to FIG. 7, a plurality of extensive fingers 54 are formed on the end of the actuator body 28 and, as particularly illustrated in FIG. 7, the transducer support arms 30, 32 are mounted on the fingers 54 via holes formed through the fingers 54. Specifically, each finger 54 has a first side 56 (the undersides as viewed in FIG. 1) and an opposite second side 58. Near the distal ends of the fingers, first and second holes, 60 and 62, corresponding to the first and second holes through the transducer support arms respectively as defined above are formed through the fingers 54 to intersect the first and second sides 56 and 58 and extend therebetween. In the practice of the invention, and as shown in FIG. 7, the first hole 60 through each finger 54 is formed coaxially with the first holes 60 through each of the other fingers and the second hole 62 through each finger is similarly formed coaxially with the second holes 62 though the remaining fingers. Thus, the totality of first and second holes, 60 and 62 respectively, form a pair of open channels that extend completely through the actuator body 28.

In the practice of the invention, each first transducer support arm 30 is mounted on the actuator body 28 such that the leaf member 36 thereof engages the first side of one of the fingers 54 and the boss about the first transducer support arm hole of the first transducer support arm 30 extends into the first hole 60 formed through the finger 54 in a first direction that has been indicated at 64 in FIG. 7. The remaining, or second transducer support arm, hole through each first transducer support arm 30 is aligned with the second hole 62 through the finger 54. Similarly, each second transducer support arm 32 is mounted on the actuator body 28 such that the leaf member 36 thereof engages the second side of one of the fingers 54 and the boss about the second transducer support arm hole of the second transducer support arm 32 extends into the second hole 62 formed through the finger 54 in a second direction 66 that has also been indicated in FIG. 7. The remaining, or first transducer support arm, hole through the second transducer support arm is aligned with the first hole 60 formed through the finger 54.

The transducer support arms 30, 32 are secured to the fingers 54 in a manner that has also been illustrated in FIG. 7. Specifically, to mount the transducer support arms 30, 32 on the fingers 54, the bosses 44 are constructed to have outside diameters that will slip into the holes 60 and 62 through the fingers 54 so that the transducer support arms 30, 32 can be assembled on the fingers 54 in the manner described above by merely inserting the swage plates 34 and portions of the leaf members 36 between the fingers 54 and inserting bosses into holes 60, 62 through the fingers 54 as described Thereafter, spacers 68, having a pair of spaced apart holes 70 and 72 formed therethrough to align with the first and second holes 60 and 62 formed through the fingers 54 are inserted between transducer support arms 30, 32 on adjacent fingers 54 and the fingers 54, transducer support arms 30, 32, and spacers 68 are placed between platens 74 and 76 of a suitable press. The platens 74, 76 are each provided with a pair of longitudinally extending holes 78 and 80 that are spaced to align with the first and second holes 60 and 62 respectively through the fingers 54. Thus, the two open channels formed through the actuator body 28 by the placement of the first and second transducer support holes through the transducer support arms 30, 32 discussed above are continued through the spacers 68 and the platens 74 and 76. The press is then operated to clamp the transducer support arms to the fingers and a swaging implement 82, which is preferably a ball having a diameter slightly greater than the diameter of the reduced diameter bore portion 46 of the boss 44 (FIG. 6), is then driven by a rod 84 in the second direction 66 through the bores of the bosses located in the first holes 60 through the fingers 54. The ball causes such bosses 44 to expand into tight engagement with the inner peripheries of the holes 60 to secure the first transducer support arms 30 to the fingers 54. Similarly, a swaging implement, also preferably a ball having a diameter slightly greater than the diameter of the reduced diameter bore portion 46 of the boss 44, is driven in the first direction 64 through the bosses 44 in the second holes 62 through the actuator body fingers 54 by a rod 88 to expand such bosses into gripping engagement with the inner peripheries of the holes 62. It will be noticed that, for each transducer support arm 30, 32, the direction of travel of the swaging implement will be a direction opposite the extension of the boss on the transducer support arm from the body portion 38 of the swag plate 34 so that the bosses will be placed in compression by the swaging operation to form a strong joint between the transducer support arms 30, 32 and the actuator body 28.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A transducer head support apparatus for supporting transducer heads in proximity to surfaces of stacked data storage disks of a hard disk drive, comprising:

an actuator body mounted in the hard disk drive adjacent the stack of data storage disks, the actuator body having a plurality of extensive fingers formed on one end thereof and each finger having first and second spaced apart holes formed therethrough near the distal end thereof to intersect opposite first and second sides of the finger and extend therebetween, wherein the first hole through each finger is axially aligned with the first hole through the other fingers and the second hole through each finger is axially aligned with second holes through the other fingers;

a plurality of first transducer support arms mounted on the actuator body and extending therefrom to support a transducer head proximate a surface of a disk, each first transducer support arm mounted on the first side of one of said fingers and having a boss extending into the first hole on the finger and sized to mate with the first hole so as to secure the first transducer support arm to the finger; and a plurality of second transducer support arms mounted on the actuator body and extending therefrom to support a transducer head proximate a surface of a disk, each second transducer support arm mounted on the second side of one of said fingers and having a boss extending into the second hole on the finger and sized to mate with the second hole so as to secure the second transducer support arm to the finger.

2. The transducer head support assembly of claim 1 wherein each of the first and second transducer support arms comprises:

a swage plate whereon said boss is formed; and an extensive leaf member spot welded to the swage plate and extending therefrom for supporting a transducer head at a selected distance from the actuator body.

3. In a transducer support arm for a hard disk drive, said transducer support arm including a swage plate for attaching the support arm to an actuator body mounted in the hard disk drive for moving transducer heads substantially radially across rotatable data storage disks and an extensive leaf member attached to the swage plate for supporting a transducer head in proximity to the surface of a disk, the improvement wherein the swage plate is characterized as comprising:

a laminar body portion have two spaced apart holes formed therethrough to intersect opposite sides of the body portion and extend therebetween; and a tubular boss formed integrally with the body portion on one side of the body portion and extending circumferentially about one of said holes formed through the body portion.

4. A method for mounting a plurality of transducer support arms on an actuator of a hard disk drive, said actuator including an actuator body having a plurality of fingers extending from one end thereof, the method comprising:

forming spaced apart first and second holes through each of said fingers, wherein the first hole through each finger is formed coaxially with the first hole through the other fingers and the second hole through each finger is formed coaxially with the second hole through the other fingers;

forming spaced apart, first and second transducer support arm holes through each of the transducer support arms to align with the first and second holes through the fingers of the actuator body, wherein a tubular boss is formed on each transducer support arm about a selected one of the first and second transducer support arm holes therethrough;

clamping the transducer support arms to the fingers on the actuator body so that the tubular bosses formed about the first transducer support arm holes through the first transducer support arms extend in a first direction into the first holes in the fingers of the actuator body and the tubular bosses formed about the second transducer support arm holes through the second transducer support arms extend in a second direction into the second holes in the fingers of the actuator body; and driving swaging implements through the bores of the bosses to expand the bosses into gripping contact with the peripheries of the holes formed through the fingers, wherein the swaging implement driven through the bosses formed about first transducer support arm holes of the transducer support arms are driven therethrough in said second direction and the swaging implement driven through the bosses formed about second transducer support arm holes of the transducer support arms are driven therethrough in said first direction.

* * * * *

UNITED STATES PATENT AND TRADEMARK OFFICE
CERTIFICATE OF CORRECTION

PATENT NO. : 5,262,911
DATED : November 16, 1993
INVENTOR(S) : Michael A. Cain & Steven S. Eckerd It is certified that error appears in the above-indentified patent and that said Letters Patent is hereby corrected as shown below:

Column 1, line 21, delete "a" and substitute therefor --an--; and

Column 3, line 58, delete "o" and substitute therefor --or--.

Signed and Sealed this

Twenty-eighth Day of June, 1994

Attest:

BRUCE LEHMAN

*Attesting Officer*     *Commissioner of Patents and Trademarks*